Patented July 26, 1932

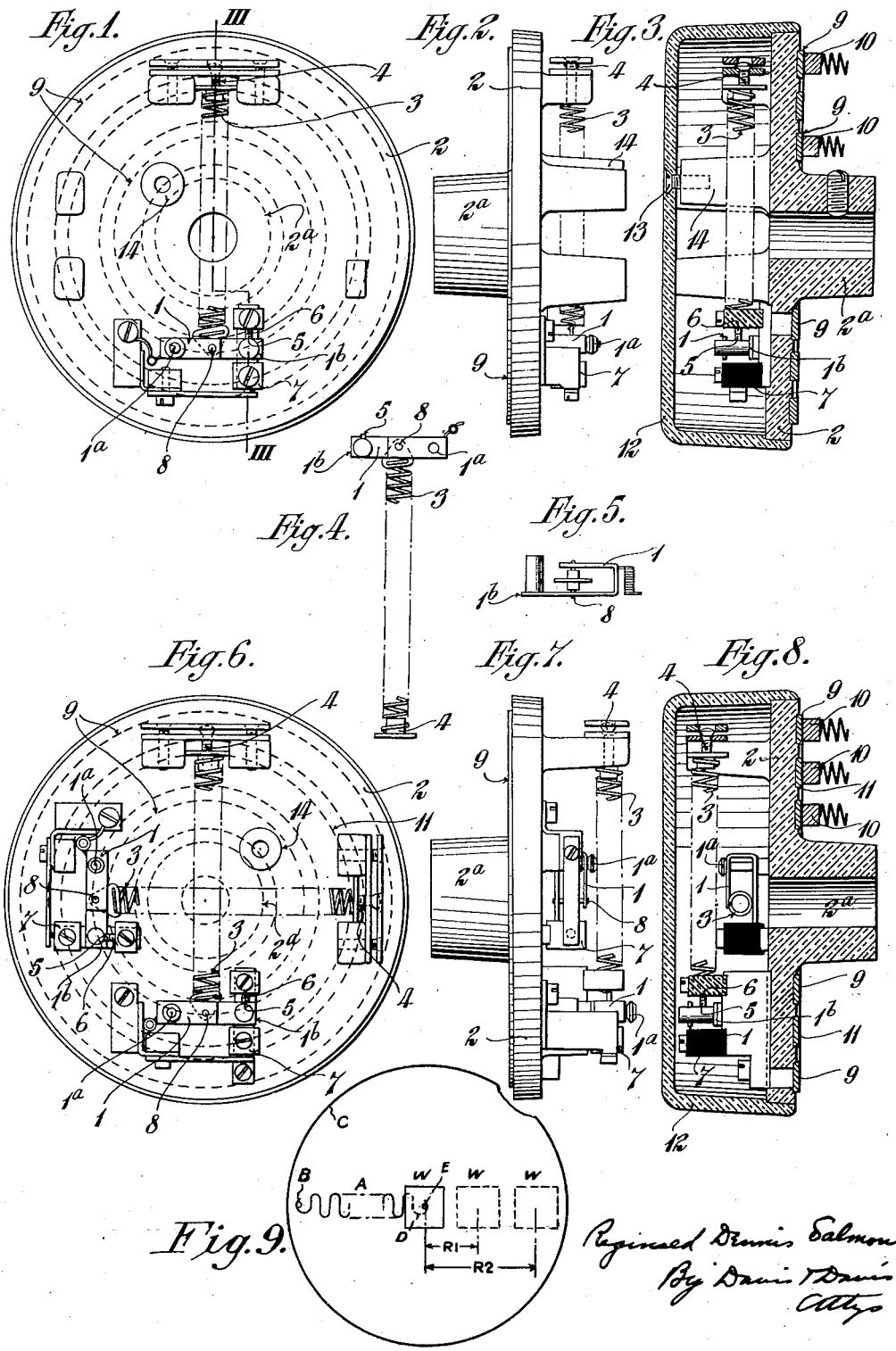

1,868,616

UNITED STATES PATENT OFFICE

REGINALD DENNIS SALMON, OF CROYDON, ENGLAND, ASSIGNOR TO CREED & COMPANY, LIMITED, OF CROYDON, ENGLAND

SPEED GOVERNOR

Application filed February 24, 1928, Serial No. 256,793, and in Great Britain March 8, 1927.

This invention relates to improvements in isochronous speed governors, where a weight, mounted to rotate about the axis of a rotary driving member, such as a disc, is connected to a spring with which is associated adjusting means whereby the weight can, when the governor is at rest, be caused to assume a position such that its centre of gravity is normally co-axial with the axis of revolution, with the spring in an unstrained condition, so that when the governor is afterwards being driven by the motor, the speed of which is to be maintained as nearly as possible constant, and is running at a predetermined desired speed, the centrifugal force due to the weight, will exactly balance the force due to the extension of the spring, for any position that the weight may happen to be in, but for any other speed, the centrifugal force will always be greater, or always less, than the spring force for any position of the weight. Consequently, if the speed falls below the predetermined speed, the weight will move toward the centre of motion, as far as it is allowed to move, or if the speed increases above the predetermined speed, the weight will move away from the centre of movement, as far as it is allowed to move, and in each case bring about an adjustment of the speed controlling means of the motor so as to cause the motor again to run at the predetermined speed, as well understood. An object of the invention is to provide an improved governor of the type referred to capable of more effectively controlling the speed of a motor which drives the governor and actuates telegraphic or other apparatus.

In the accompanying illustrative drawing, Figs. 1 and 2 are respectively front and side elevations of one construction of governor according to the invention with the casing removed. Fig. 3 is a section on the line III—III of Fig. 1. Figs. 4 and 5 are respectively a front elevation and plan of the weight and spring shown in Figs. 1, 2 and 3. Figs. 6, 7 and 8 are similar views to Figs. 1, 2 and 3 showing a double governor. Fig. 9 illustrates a schematic view of the speed regulating mechanism.

According to the invention the correct proportions for the spring and weighted contact employed in the governor may be determined for any predetermined desired speed and to clarify this idea attention is directed to Fig. 9 wherein A is a helical spring fixed securely at B to the rotatable disc C. The free end D of the spring A is attached to the weighted movable member W coincident with the centre of gravity thereof. Spring A is of such length that when the centre of gravity of W lies on the axis of rotation E of the disc C, spring A is relieved of all strain. The centre of gravity of W and all points of attachment B and D all lie on a straight line. The weight W is constrained so as to move only along the diameter containing points B and E and across the origin of disc C.

If now the weight W is moved to any position in a direction diametrically away from B and if the weight be restrained from returning towards B, spring A will be under certain tension. This tension, as is well known, will be directly proportional to the amount by which the spring has been extended, or in other words, to the radial distance $R_1$ through which the centre of gravity of W has been moved from the axis of rotation E.

If the disc C be now set in motion, a centrifugal force will be set up acting on weight W in a direction opposite to the tension of the spring A. If the speed of disc C is increased, the centrifugal force will increase according to well known physical laws until a certain speed which may be called the critical speed is reached at which centrifugal force will exactly balance the tension of the spring and at which speed there will be no resultant force tending to move W radially either inwardly or outwardly.

Since at any given speed, the centrifugal force acting on W is directly proportional to the radial distance from the centre of gravity of W to the axis of rotation and since, as has been shown, the tension of the spring is proportional to the same radial distance, then if, at the critical speed, these forces are equal and opposite for any radial distance $R_1$, they will also be equal and opposite for any other radial distance $R_2$, and similarly for all radial distances within the limit of elasticity of the spring. Thus, at the critical speed the weight W, at whatever radius it may be, experiences no resultant force tending to move it inwardly or outwardly.

At any speed above the critical speed the centrifugal force at a given radial distance R1 will be greater than the spring tension at that radius, and the resulting force will tend to move W radially outwards, say to a radial distance R2, but since both the forces acting on W are proportional to the radial distance the new centrifugal force at radial distance R2 will still be greater than the spring tension at that radius and so for any radial distance. Thus, at speeds above the critical speed the weight W will, if unrestrained, tend to move radially outward without limit.

Conversely, at speeds below the critical speed the centrifugal force is less than the restoring force of the spring and accordingly W will tend to move radially and inwardly, if unrestrained, until the centre of gravity of W lies on the axis of rotation.

It follows that after having determined beforehand the speed of rotation at which it is desired to cause the speed regulating device to operate, it is a matter of simple calculation to devise a spring having suitable dimensions and strength and a weight such that at a predetermined or critical speed the centrifugal force acting on the weight will be equal to the tension of the spring at some arbitrarily chosen distance as R1, and therefore at all radial distances, between the origin of the disc and elastic limit of the spring.

In the preferred embodiment shown in Figs. 1 to 5 inclusive, the weight is constituted by an arm 1, one end of which is pivoted at 1ª to one side of a disc 2 adapted by a boss 2ª to be fixed to a spindle driven from the motor the speed of which is to be controlled. To an intermediate point in the length of the arm 1 is connected one end of a diametrically arranged helical spring 3 the other end of which is connected to an endways adjustable screw device 4 mounted on the same side of the disc 2. The said intermediate point of the arm 1, is so chosen as to coincide with the centre of gravity of the arm. The free end portion 1ᵇ of the arm carries a movable electric contact 5 and is arranged between an insulated stationary electric contact 6 and an insulated stop 7, both fixed to the disc 2. In the example shown, the arm 1 is of U shape in plan, its legs being of unequal length, the longer leg carrying the movable contact 5. The adjacent end of the spring 3 is connected to a pivot pin 8 carried by the two legs of the arm 1 and situated at the said intermediate point thereof coinciding with the centre of gravity of the arm. The tension of the spring 3 is so adjusted by the screw device 4 that if the contact 6 and pivot 1ª were removed the arm 1 would move inward until its centre of gravity coincided with the centre of rotation of the disc 2 and the tension of the spring would be reduced to zero.

When the motor to be controlled is a series wound electric motor the stationary contact 6 is arranged at the inner side of the said weight 1 and movable contact 5 and the stop 7 at the outer side thereof, as shown in Fig. 1. When the motor to be controlled is a shunt wound electric motor, the stationary contact 6 is arranged at the outer side of the weight 1. and movable contact 5 and the stop 7 at the inner side thereof. The movable and stationary contacts 5 and 6 are electrically connected to two separate insulated slip rings 9 fixed to the other side of the disc 2 and against which bear spring controlled brushes 10 for connection to the electrical speed controlling means used for bringing back the speed of the motor to normal speed when it varies therefrom. The speed controlling means may act to vary the field or the main current of the motor, when an electric motor is used, by means of a field resistance, or a series resistance, in any known way.

Since at any speed above the speed to which the governor is adjusted the movable contact tends to move outwards without any limit, if unrestrained, and at a speed below the desired speed the movable contact tends to move inwards to an extent independent of the speed, it is apparent that at speeds above or below the critical speed, the movable contact will move outwards or inwards until stopped by the fixed contact or by the stop, the extent of the travel of the movable member between the stop and fixed contact being immaterial, having no effect upon the critical speed. If the adjustment of the governor is not quite correct, that is, if the correct relation between the spring tension and the centrifugal force has not been exactly obtained, the position of the fixed contact will affect the speed and therefore, if in operation the fixed contact is burnt or worn away so as to change its effective position, a change in speed will result; but as the adjustments approach the ideal condition, so will wear of the fixed contact have less affect on the speed.

It will be understood that the governor may be so constructed that either the spring member or its attachment to the weighted movable contact or both may conform only approximately to the required conditions, but provided however the radius R1, upon which the equality of the force is precalculated is chosen, so as to be equal to the radius at which the weight will operate in practice, the linear relation between spring tension and radius will so nearly be in accord with the linear relation between centrifugal force and the radius, over small working distances, that the action of the device will not depart appreciably from the theoretical action as discussed.

In the modified construction shown in Figs. 6, 7 and 8, a second weight and spring and adjusting means, with associated electrical contacts and a stop, are mounted on the same side of the disc 2 and arranged at right angles to and independent of the first weight, spring adjusting means with associated electrical contacts and stops. This arrangement constitutes two independent governors carried by the same disc, one governor being adapted to govern the motor at one speed, and the other to govern the motor at a different speed, as is sometimes desired. The electric contacts of the two governors may be connected to separate pairs of insulated slip rings. Or one of the rings of each pair may be replaced by a single slip ring 11 (Fig. 8) common to the two governors.

In each of the arrangements above described, a cover 12 may, as shown in Figs. 3 and 8, be used to protect the various parts of the governor, or governors, the said cover embracing the edge of the disc 2 and being secured in position as by means of a screw 13 engaging a projection 14 carried by the disc, or by other means.

The motor instead of being an electrical one, may be a mechanically operated one and its speed be directly controlled by mechanical means under the control of electrical means the circuit of which is controlled by a speed governor constructed as hereinbefore described.

From the foregoing, it will be understood that the speed at which the governor operates, depends only upon factors which are very constant, namely, the strength of the spring 3 and the mass of the weight 1, and not upon any other factors which are not constant, such as the position of electrical contacts. Consequently, once the governor is correctly adjusted, it can only govern at one speed, if constructed as shown in Fig. 1 to 5 inclusive, or at one or the other of two different speeds if constructed according to Figs. 6, 7 and 8, and any wear which may take place at the contacts will not vary that speed or speeds. To enable the governor, or each governor, to govern at any speed required, the strength of the spring and the mass of the weight must be suitably chosen.

What I claim is:—

1. A speed governor, comprising a rotary member, a spring, a weight connected to said spring, adjusting means connected to said rotary member and to said spring and whereby the weight can, when the governor is at rest be caused to assume a position such that its centre of gravity will be co-axial with the axis of rotation of said member with the spring in an unstrained condition, an electric contact and a stop fixed to said member at different radial distances from the axis of rotation thereof and between which said weight is movably located with the spring in a strained condition, said weight being adapted to occupy any position when the governor is running at the speed at which it has been set to run and to rest against said stop or contact, whichever may be required when the speed departs from normal speed, so as to bring the speed back to the normal speed.

2. A speed governor comprising a rotary member, a spring, a weight connected to said spring, movably arranged in relation to said member, and adapted to serve as an electric contact, adjusting means connected to said spring whereby the said weight can, when the governor is at rest, be caused to assume a position with its centre of gravity co-axial with the centre of rotation of said member and with the spring in an unstrained condition, a stop and an electric contact, both fixed to said member at different radial distances from the axis of rotation thereof and between which said weight is movably located with the spring in a strained condition.

3. A speed governor according to claim 2, wherein the weight is in the form of an arm pivoted to the rotary member.

4. A multiple speed governor comprising a rotary member, two springs extending diametrically across the axis of the rotary member and at right angles to each other, a weight in the form of a contact lever for each spring pivotally mounted at one end on the rotary member and connected to one end of its associated spring, a stop and an electric contact for each contact lever mounted on the rotary member at different distances from its axis of rotation, adjusting means for each spring connected to the other end thereof and mounted on the rotary member, each contact lever being positioned between its associated stop and electric contact, the two springs with their weights being adapted to function at different speeds of rotation of the rotary member.

5. In an electrical governor for regulating the speed of a motor comprising a rotatable member having a fixed and movable contact, a spring connected to the movable contact at the centre of gravity thereof and extending across the axis of rotation of said rotatable member, the relation between the movable contact and said spring being such that at a critical speed of said governor the centrifugal force of said movable contact counterbalances the restoring force of said spring and at said critical speed, the movable contact assumes a fixed position relative to said rotatable member.

6. In an electrical governor, a rotatable member including circuit making and breaking means comprising a fixed and movable member, a spring carried by said rotatable member and connected at the centre of gravity of said movable member with one terminal thereof coincident with the origin of said rotatable member at zero tension of said spring which counterbalances the centrifugal force of said movable member at any extension of said spring from said origin for a predetermined speed of said rotatable member to which said governor is adjusted.

7. In an electrical governor, a rotatable member, circuit making and breaking means comprising a fixed and movable member carried by said rotatable member, a spring associated therewith and connected at the centre of gravity of said movable member, means holding said spring in tension to counterbalance the centrifugal force of said movable member at any extension of said spring from the origin of said rotatable member for a predetermined speed of said rotatable member to which said governor is adjusted.

8. As an article of manufacture for regulating the speed of a prime mover comprising a rotatable member having a movable and fixed contact, a spring connected at the centre of gravity of said movable contact and extending across the axis of rotation of said rotatable member and carried by the latter whereby at any speed above a predetermined speed of said rotatable member said movable contact tends to move radially and outwardly without limit, if unrestrained.

9. As an article of manufacture for regulating the speed of a prime mover comprising a rotatable member having a stop and fixed contact, a movable contact disposed between said stop and fixed contact, a spring connected at the centre of gravity of said movable contact and extending across the axis of rotation of said rotatable member and carried by the latter whereby at any speed above a critical speed of said rotatable member, said movable contact moves radially and outwardly against said stop or fixed contact for connecting said prime mover to electrical controlling means and restore said rotatable member to said critical speed.

10. An electrical governor for regulating the speed of a motor comprising a rotatable member having a movable and fixed contact, a spring connected at the centre of gravity of said movable contact and extending across the origin of said rotatable member and carried by the latter whereby at a speed below the critical or predetermined speed of said governor the restoring force of said spring overcomes the centrifugal force of said movable contact.

11. As an article of manufacture for regulating the speed of a prime mover comprising a rotatable member having a stop and fixed contact, a movable contact disposed between said stop and fixed contact, a spring connected at the centre of gravity of said movable contact and extending across the axis of rotation of said rotatable member and carried by the latter whereby at a speed below the critical or predetermined speed of said rotatable member, the restoring force of said spring overcomes the centrifugal force of said movable contact moving the latter against either said stop or fixed contact for connecting said prime mover to electrical controlling means and restore said rotatable member to said predetermined speed.

12. A speed regulating device for controlling the speed of a prime mover comprising a rotatable member including a fixed and movable contact, a spring carried by said rotatable member and connected at the centre of gravity of said movable member and disposed across the origin of said rotatable member for maintaining a predetermined speed of said device irrespective of any wear of said contacts.

13. Means for regulating the speed of a prime mover comprising a rotatable member including a fixed and movable contact, a spring mounted at the centre of gravity of said movable contact and extending across the origin of said rotatable member and secured thereto for maintaining a predetermined speed of said rotatable member.

14. A centrifugal switch for controlling the speed of a prime mover, a rotatable member including a fixed and movable contact, a spring extending across the origin of said rotatable member and secured thereto and at the centre of gravity of said movable contact, means to adjust said spring for a critical speed of said switch at which the centrifugal force of the movable contact balances restoring force of said spring at any radius distance from the centre of gravity of said movable contact to the axis of rotation of said rotatable member.

15. A governor adapted to control the speed of a motor comprising a rotatable member having a fixed and movable contact, a spring connected at the centre of gravity of said movable contact and extending across the origin of said rotatable member and fixed thereto, adjustable means for setting said spring whereby at a critical speed of said rotatable member, the centrifugal force of said movable contact tends to move outwardly and radially without any limit if unrestrained, and at a speed below the critical speed said movable contact moves inwardly and radially to an extent independent of the speed of said governor.

Signed at London, England, this 14th day of February, 1928.

REGINALD DENNIS SALMON.